United States Patent
Ogaki et al.

(10) Patent No.: US 6,771,383 B1
(45) Date of Patent: Aug. 3, 2004

(54) IMAGE PROCESSING SYSTEM

(75) Inventors: Takeshi Ogaki, Tama (JP); Akinori Iwase, Yokosuka (JP); Yoshiko Takeda, Yokohama (JP); Kazuhiro Ogura, Kawasaki (JP)

(73) Assignees: Kabushiki Kaisha Toshiba, Kawasaki (JP); Toshiba Tec Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/452,098

(22) Filed: Dec. 2, 1999

(30) Foreign Application Priority Data

Dec. 2, 1998 (JP) .......................................... 10-343178

(51) Int. Cl.[7] .................................................. G06K 3/14
(52) U.S. Cl. ...................................... 358/1.15; 358/1.17
(58) Field of Search ................................ 358/1.15, 1.9, 358/403–404, 1.18, 1.16–1.17

(56) References Cited

U.S. PATENT DOCUMENTS

| | | | |
|---|---|---|---|
| 5,150,221 A | 9/1992 | Shima ........................ | 358/403 |
| 5,161,214 A | 11/1992 | Addink et al. .............. | 395/145 |
| 5,319,748 A | 6/1994 | Motoyama .................. | 395/162 |
| 5,485,368 A | 6/1996 | Ogaki et al. | |
| 5,625,770 A | 4/1997 | Nomura ....................... | 395/761 |
| 5,819,040 A | 10/1998 | Ogaki et al. ........... | 395/200.47 |
| 6,052,207 A | 4/2000 | Takagi et al. | |
| 6,188,490 B1 * | 2/2001 | Miyake ..................... | 358/1.18 |
| 6,583,890 B1 * | 6/2003 | Mastie et al. .............. | 358/1.18 |

FOREIGN PATENT DOCUMENTS

| | | |
|---|---|---|
| JP | 5-35802 | 2/1993 |
| JP | 8-7070 | 1/1996 |
| JP | 8-88707 | 4/1996 |
| JP | 9-16790 | 1/1997 |
| JP | 11-15724 | 1/1999 |
| JP | 11-102362 | 4/1999 |

* cited by examiner

*Primary Examiner*—Thomas D. Lee
*Assistant Examiner*—Stephen Brinich
(74) *Attorney, Agent, or Firm*—Foley & Lardner LLP

(57) ABSTRACT

The present invention is adapted to create multi-page data consisting of image data of a plurality of pages that constitute one document, and to manage the multi-page data in the same stage as single-page data that consists of image data of each page belonging to the document. As a result, an image processing system is realized which can make use of both a single-page file suitable for management or updating of image data performed in units of one page, and a multi-page file suitable for processing of image data performed in units of one document.

6 Claims, 10 Drawing Sheets

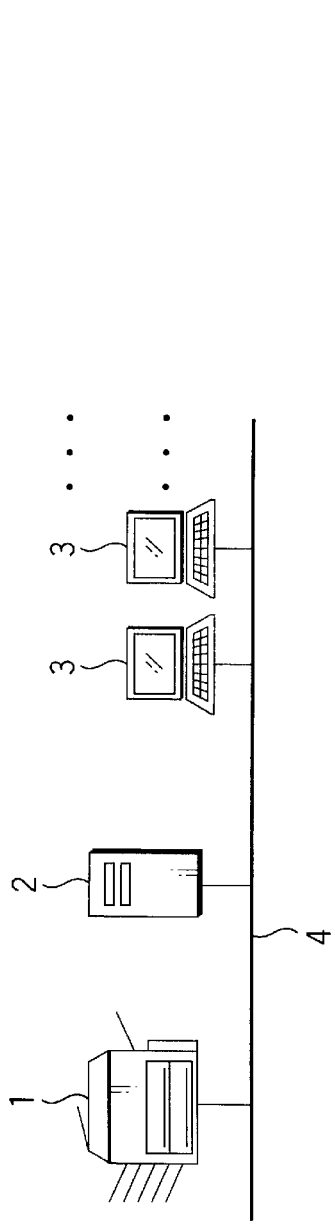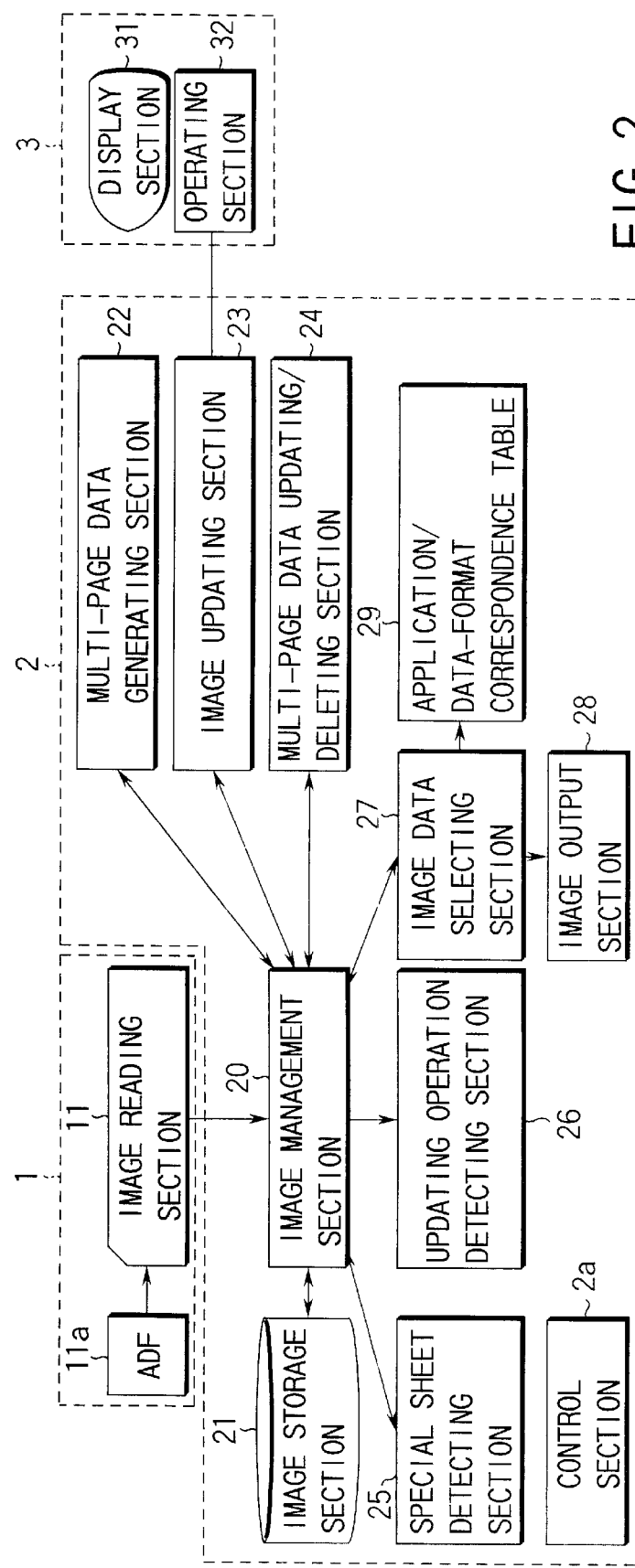

⟨INCLUDING SEPARATOR⟩  ⟨INCLUDING NO SEPARATOR⟩

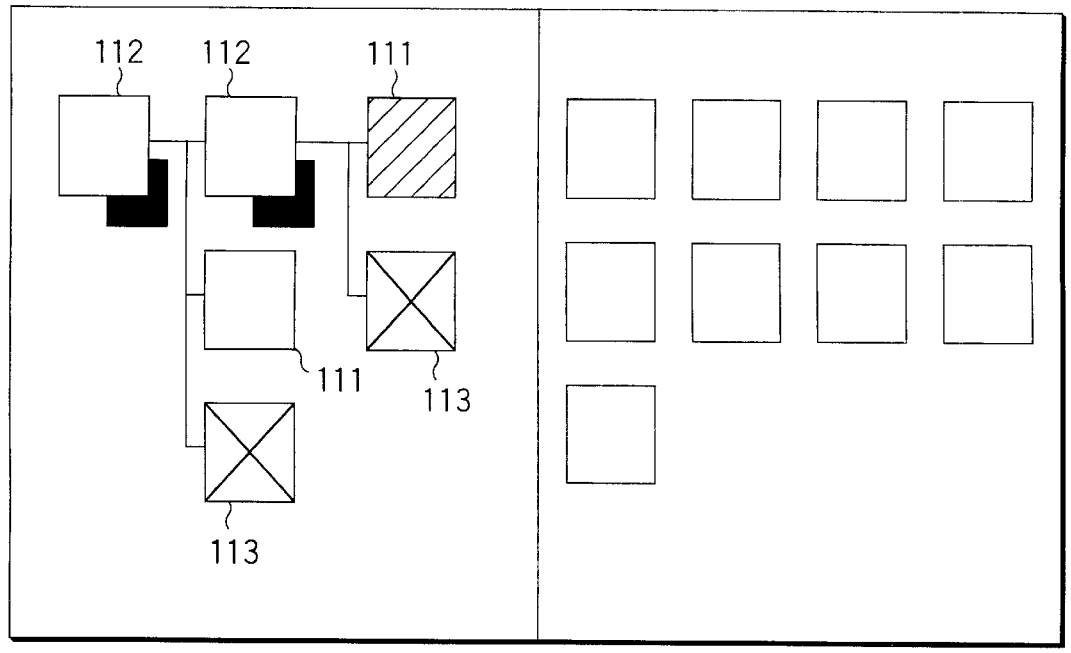
FIG. 11
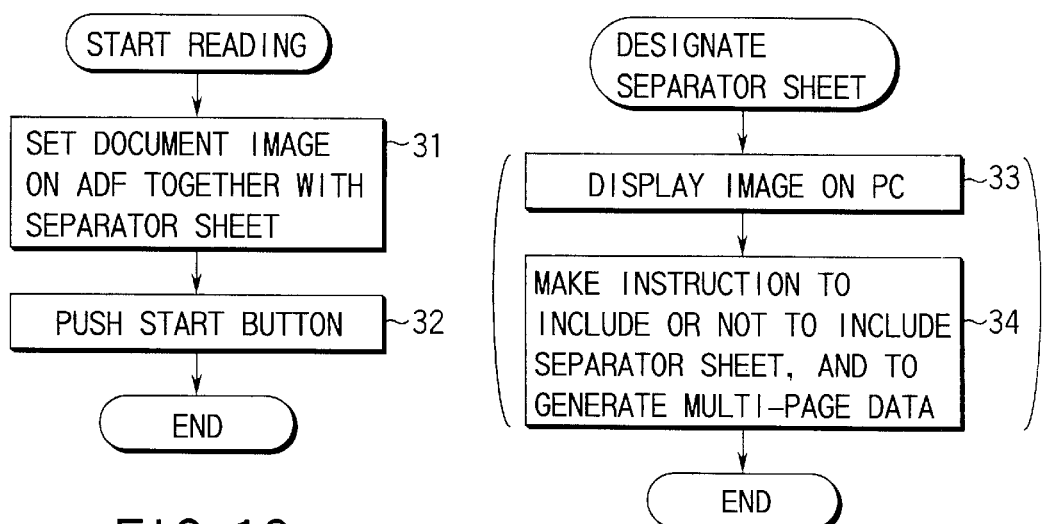
FIG. 12
FIG. 13

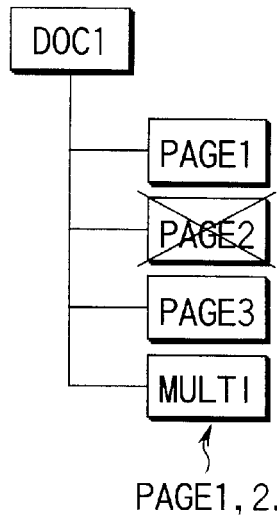
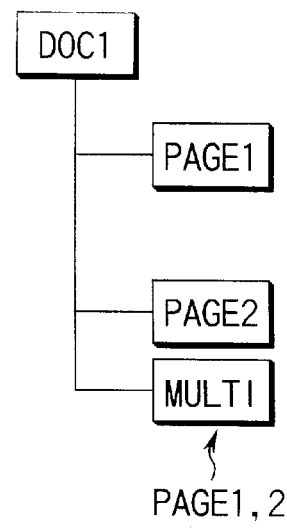
FIG. 15A                FIG. 15B
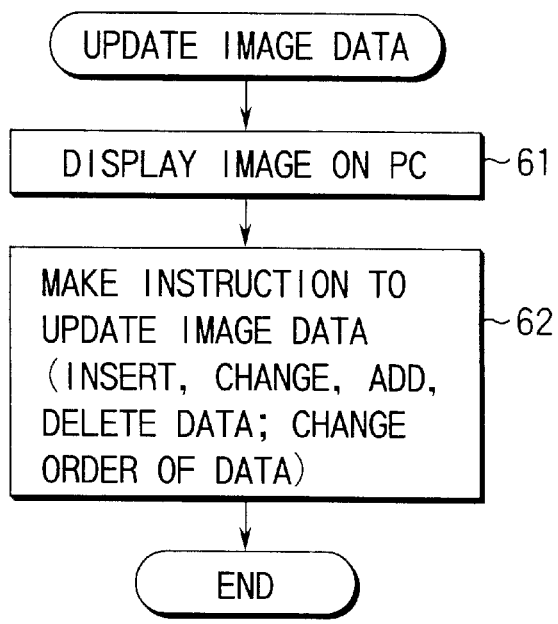
FIG. 16

| APPLICATION NAME | VERSION | CORRESPONDING MULTI-PAGE DATA FORMAT |
|---|---|---|
|  |  |  |
|  |  |  |
| ⋮ | ⋮ | ⋮ |

IMAGE PROCESSING SYSTEM

BACKGROUND OF THE INVENTION

This invention relates to an image processing system for scanning, from, for example, a network, a document consisting of a number of pages, and then managing the scanned images of the pages.

Recent image processing systems use image data of a very large number of file formats. For example, they use a single-page file format in which a single file contains image data of a single page, and a multi-page file format in which a single file contains image data of a number of pages.

In the case of the single-page file format in which image data is controlled in units of a single page, the file format, the file size or the date and time of the creation of it can be easily known from the file system. Further, processing such as updating of image data in each page can be performed by simply selecting-image data of a necessary page. In light of these merits, in lots of cases, image data is managed in units of a single page. However, the management of image data in units of a single page will make the operation of the apparatus by the user complicated when simultaneously transferring image data over pages of a document between different applications.

On the other hand, the multi-page file format, in which image data is managed in units of a document, is advantageous when simultaneously transferring, between different applications, image data contained in a document that consists of a number of pages. This format also facilitates the operation of the apparatus by the user. In light of these merits, lots of image processing systems use image data created in units of a document when transferring image data in units of a document. However, the management of image data in units of a document makes the processing such as updating of image data of each page complicated, and also makes the user's operation complicated since the user cannot choose only image data of a necessary page.

As described above, (1) it is convenient to use the single-page file in order to manage image data, while it is convenient to use the multi-file in order to transfer image data. Accordingly, an image processing system is demanded which can easily manage image data of a document and easily transfer image data in units of a document.

The following problems (2)–(5) may occur when managing image data using both the above-described single-page file and multi-page file formats:

(2) To create image data of the multi-page file format, it is necessary for the user to indicate the end or start of each document in single-page file data. Thus, the user must instruct the system to create a multi-page file, when necessary, by taking time and effort.

Furthermore, when simultaneously scanning a plurality of documents using a separator sheet that indicates the end or start of each document, the separator sheet may be erroneously detected. If image data is excluded from document image data to avoid the above situation, there may be a case where the end or start of each scanned document cannot be changed.

(3) When managing image data using both the single-page and multi-page file formats, it is necessary to secure consistency between image data items of both the file formats since inconsistency occurs therebetween when page edition has been executed thereon.

(4) When simultaneously transferring, to another application, image data created in units of a document, the user must determine whether or not the image data contains multi-page file data.

(5) When simultaneously transferring, to another application, image data created in units of a document, the user must determine whether or not the target application can receive multi-page file data contained in the image data.

BRIEF SUMMARY OF THE INVENTION

It is an object of the invention to provide an image processing system capable of easily controlling image data and easily transferring image data in units of a document.

It is another object of the invention to provide an image processing system capable of creating, by simple operations, image data of a number of pages in units of a document, from image data created in units of a page.

It is a further object of the invention to provide an image processing system capable of maintaining the consistency between image data created in units of a page, and image data of a number of pages created in units of a document.

It is a yet further object of the invention to provide an image processing system which is easy to operate and can simultaneously output image data created in units of a document.

It is another object of the invention to provide an image processing system capable of simultaneously outputting image data that is created in units of a document and corresponds to the condition of a destination.

According to a first aspect of the invention, there is provided an image processing system comprising: scanning means for scanning each of a plurality of pages that constitute a document; storage means for storing single-page data that consists of image data of each page scanned by the scanning means; management means for managing, as data belonging to the document, each item of the single-page data stored by the storage means; generation means for generating multi-page data indicating images of a plurality of pages that constitute the entire document scanned by the scanning means; and processing means for storing, in the storage means, the multi-page data generated by the generation means, and managing the single-page data items and the multi-page data as data belonging to the document, using the management means.

According to another aspect of the invention, there is provided an image processing system comprising: scanning means for scanning each of a plurality of pages that constitute a document; storage means for storing single-page data that consists of image data of each page scanned by the scanning means; management means for managing, as data belonging to the document, each item of the single-page data stored by the storage means; generation means for generating multi-page data indicating images of a plurality of pages that constitute the entire document scanned by the scanning means; processing means for storing, in the storage means, the multi-page data generated by the generation means, and managing the single-page data items and the multi-page data as data belonging to the document, using the management means; first determination means for determining, when an instruction is made to output a document managed by the management means, whether or not the document contains multi-page data; designating means for designating a destination for receiving the multi-page data; second determination means for determining, when the first determination means has determined that the document contains the multi-page data, whether or not the destination can receive the multi-page data; and output means for outputting the multi-page data when the second determination means has determined that the destination can receive the multi-page data, and for outputting all single-page data items belonging to the document, when the first determination means has determined that the document does not contain the multi-page data, or when the second determination means has determined that the destination cannot receive the multi-page data.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 1 is a schematic view illustrating an image processing system according to the embodiment of the invention;

FIG. 2 is a block diagram roughly illustrating the structure of the image processing system;

FIG. 11 is a view showing a display example of an image;

FIG. 12 is a flowchart useful in explaining a read start operation;

FIG. 13 is a flowchart useful in explaining the operation of indicating whether or not the separator sheet is included in a document;

FIGS. 15A and 15B are views illustrating a change in management structure assumed when the file has been updated;

FIG. 16 is a flowchart useful in explaining an operation performed when updating an image;

DETAILED DESCRIPTION OF THE INVENTION

Figure 3A:
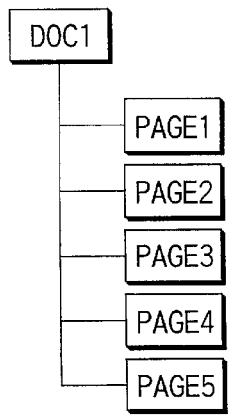
FIGS. 3A and 3B are views illustrating image management structures.

Reference will now be made in detail to the presently preferred embodiment of the invention as illustrated in the accompanying drawings.

FIGS. 1 and 2 show the structure of an image processing system according to the invention.

As shown in FIG. 1, the image processing system comprises a digital copy machine 1, a file server 2, and a personal computer (PC) 3. The digital copy machine 1, the file server 2 and the PC 3 are connected to each other via a communication line 4.

As shown in FIG. 2, the digital copy machine 1 has an image reading (scanning) section 11 for reading a document image, and an auto document feeder (ADF) 11a for feeding documents one by one to the image reading section 11. The entire digital copy machine 11 is controlled by a controller (not shown). In the image processing system, an image reading device (scanner) may be used in place of the digital copy machine 1.

As shown in FIG. 2, the file server 2 includes an image management section 20, an image storage section 21, a multi-page data creating section 22, an image updating section 23, a multi-page data updating/deleting section 24, a special sheet detecting section 25, an updating operation detecting section 26, an image data selecting section 27, an image output section 28, an application/data-format correspondence table 29, etc.

The image management section 20 stores management data for each file as image data. The image storage section 21 stores image data in units of a file. The multi-page data creating section 22 creates multi-page data consisting of image data of a number of pages. The image updating section 23 updates image data. The multi-page data updating/deleting section 24 performs processing such as updating, deleting, etc. of multi-page data. The special sheet detecting section 25 detects, from read image data, a special sheet (separator sheet) that indicates the start of a document. The updating operation detecting section 26 detects the updating of image data. The image data selecting section 27 selects image data to be transferred to or from another application. The image output section 28 outputs image data to, for example, another application. The application/data-format correspondence table 29 stores information that indicates the relationship between other applications and multi-page data formats.

The personal computer (PC) 3 is operated by the user to display or change document images or management data stored in the file server 2, and is controlled by a controller (not shown).

As shown in FIG. 2, the PC 3 has a display section 31, an operating section 32, etc. The display section 31 displays an icon indicating image data for each file stored in the image storage section 21, or displays information indicating how each file as image data is constructed and managed. The operating section 32 is used to, for example, operate the icon displayed on the display section 31 or to push a start button for instructing the system to read a document.

The above-described structure can be provided in each device that is connected to a network, without being physically limited. In other words, each element of the present invention may be provided in any device connected to the same network. For example, the image management section 20, the image storage section 21 and the multi-page data generating section 22 may be incorporated in the digital copy machine 1 or in the file server 2. However, the display section 31 and the operating section 32 are generally incorporated in the PC 3.

Referring to FIGS. 1–6, the first embodiment will be described in more detail. This embodiment can be realized by the image reading section 11, the image management section 20, the image storage section 21, the multi-page data generating section 22, the display section 31 and the operating section 32.

Figure 3B:
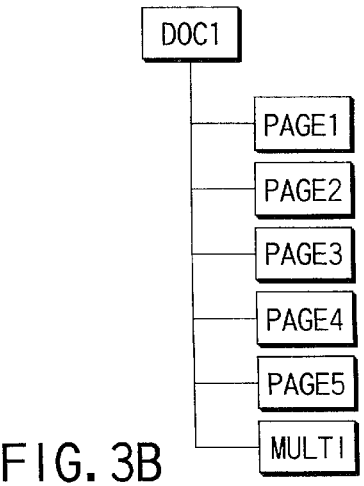

FIGS. 3A and 3B show the structures of management data items stored in the image management section 20 for managing each file format stored as image data in the image storage section 21 in the file server 2. The image management section 20 manages, in stages, the files stored in the image storage section 21 such that each file has a data structure including at least a document (DOC) and pages (Page) as structural elements.

For example, as shown in FIG. 3A, when a document 1 (DOC1) consisting of five pages has been read, the image storage section 21 stores image data for each page as a single-page (data) file. Then, the image management section 20 manages each single-page file by storing management data which indicates that each single-page file is for the document 1.

Further, the multi-page data generating section 22 generates multi-page data (Multi) consisting of image data of the entire document 1 of five pages. The image storage section 21 stores the multi-page data as a multi-page file as shown in FIG. 3B. Accordingly, the image management section 20 manages the multi-page file by storing, in the same stage as each single-page file, management data which indicates that the multi-page file is for the document 1.

The multi-page data is stored as a multi-page file wherein image data of a plurality of pages that constitute one document is considered one data item. The multi-page file is managed in a secondary stage after a primary stage (i.e. a document stage), i.e. in the same stage as each single-page file. In other words, the multi-page file differs from a document (DOC) as the primary stage of each single-page file included in one document, in that the former file is managed as image data file of the entire document in the same stage of each single-page file of one document.

The image management section 20 stores, in the secondary stage below the primary stage for the document 1 (DOC1), management data for the multi-page data of the document 1, together with the management data for each single-page file.

As a result, both the single-page file consisting of image data of each page, and the multi-page file consisting of image data of all the pages of one document can be managed, in the same stage, as files that belong to one document.

Figure 4A:
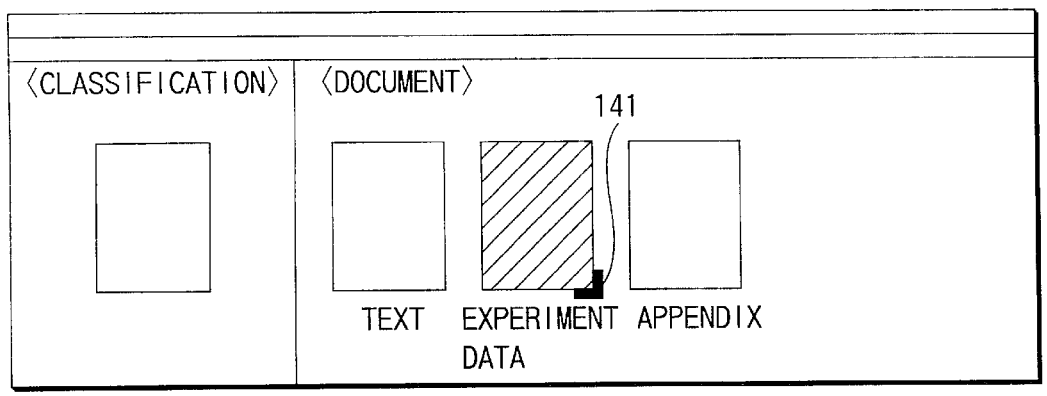
FIGS. 4A and 4B are views showing display examples of images.
Figure 4B:
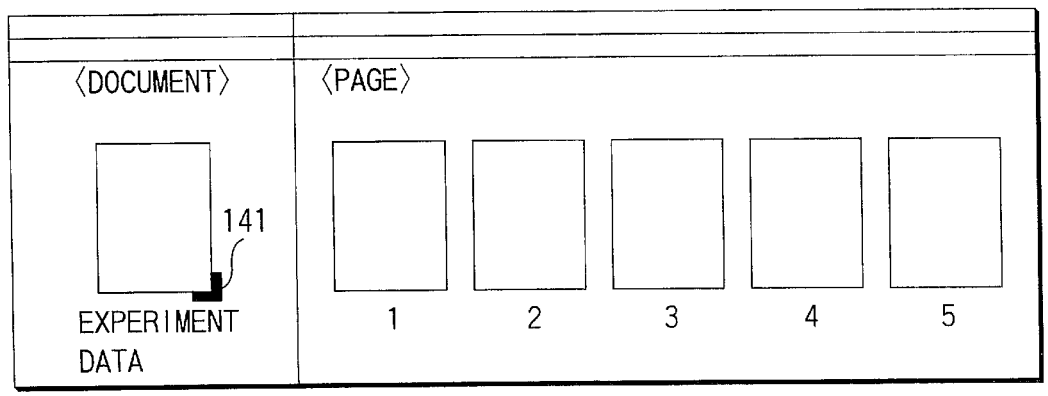

FIGS. 4A and 4B illustrate examples where management data created by the management section 20 and having a stage structure as above for each file of a document is displayed.

When, for example, the user has operated the operating section 32 of the PC 3 to instruct the PC 3 to display stored management data, icons indicating documents are displayed on the display section 31 as shown in FIG. 4A. After the user selects a document using a corresponding icon, the PC 3 analyzes the files of the image data in stages in accordance with the management data structure for the selected document in the image management section 20 as shown in FIG. 3B. Based on the analysis results, the display section 31 displays at least the selected document, and each page of the selected document, as is shown in FIG. 4B. The display screen of the display section 31 is divided into two left and right areas. A document is displayed on the left area, and pages are displayed on the right area. Each page may be indicated by an image obtained by contracting an actual image, or by a file name. Although the multi-page data exists in the same stage as each page in the management data structure, it is not displayed on the right area of the display section 31. This is because the multi-page data indicates the image data of the entire document, and corresponds to the document stage.

Further, when displaying a document as shown in FIGS. 4A and 4B, a document that contains multi-page data is displayed, using an icon different in shape or color from an icon that indicates a document without any multi-page data. This enables the user to discriminate a document with multi-page data at a glance.

Figure 5:
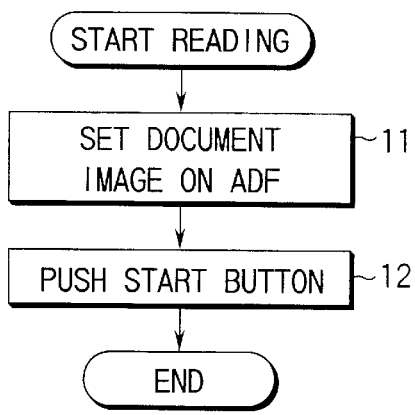
FIG. 5 is a flowchart useful in explaining the read start operation of a document.
Figure 6:
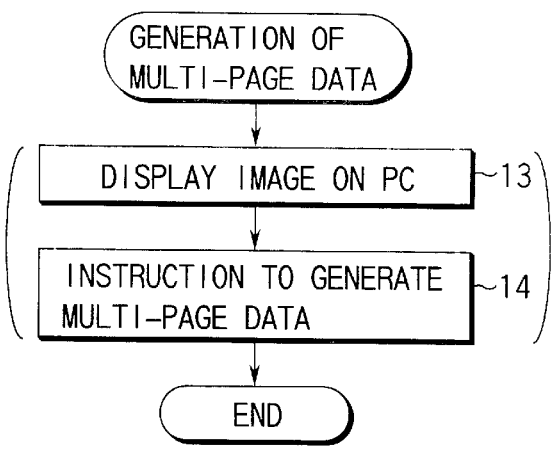
FIG. 6 is a flowchart useful in explaining a multi-page data creating operation.

Referring then to the flowcharts of FIGS. 5 and 6, the operation of generating multi-page data will be described.

First, the user sets each document, which consists of a plurality of pages, on the ADF 11a to make images therein be read (step 11). Then, a start button (not shown) in the operating section 32 is pushed (step 12), thereby causing the digital copy machine 1 to start the reading of each document on the ADF 11a.

When generating multi-page data in accordance with the instruction of the user, if a read image is displayed on the display section 31 of the PC 3 (step 13), the user selects a document for which multi-page data is to be generated, using the operating section 32, and instructs the PC 3 to generate multi-page data for it (step 14).

Figure 7:
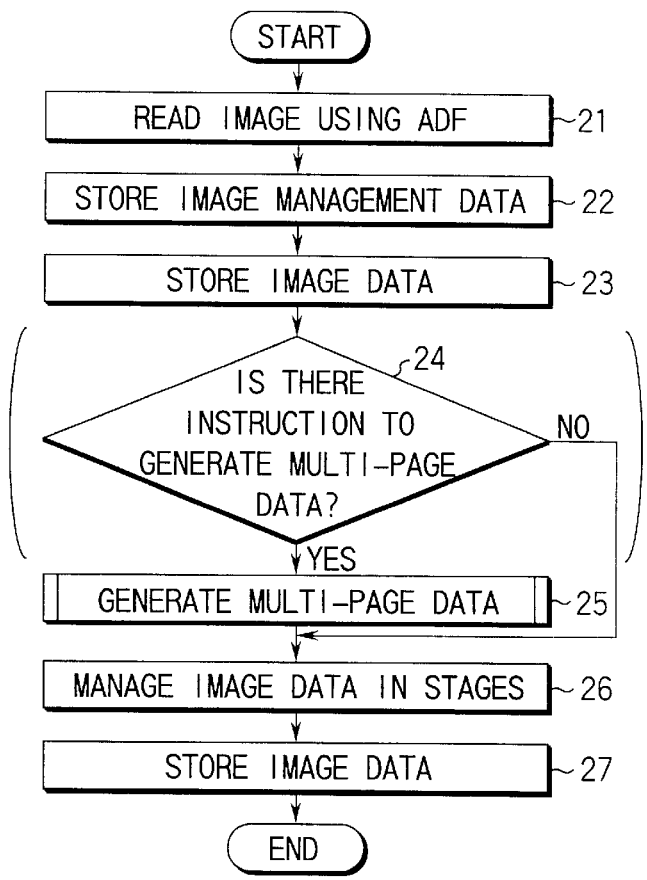
FIG. 7 is a flowchart useful in explaining the operation of the image processing system performed when creating multi-page file data.

Referring now to the flowchart of FIG. 7, the operation of the image processing system performed to generate multi-page data will be described.

When a document has been set on the ADF 11a of the digital copy machine 1 and the start button has been pushed using the operating section 32, the ADF 11a feeds the document page by page. Images on the pages of the document fed through the ADF 11a are sequentially read by the image reading section 11 (step 21). Then, the digital copy machine 1 transmits image data corresponding to the read images to the file server 2 via the communication line 4.

The file server 2 receives single page data as image data (Page) of each page transmitted from the digital copy machine 1. The control section 2a causes the image management section 20 to store, as the secondary stage of the document (DOC), management data for the file of the single page data (step 22). At the same time, the control section 2a causes the image storage section 21 to store, as a single-page file, image data for each page to be managed using the management data (step 23).

Furthermore, the control section 2a causes the multi-page data generating section 22 to generate multi-page data wherein image data of a plurality of pages that constitute one document is considered one data item (step 25). The control section 2a causes the image management section 20 to store management data for the generated multi-page data (Multi) in the secondary stage of the document (DOC) in which management data for each single page data is stored (step 26). At the same time, the file server 2 causes the image storage section 21 to store the generated multi-page data as a multi-page file (step 27).

As described above, image data of each page included in a document is managed as a single-page file belonging to the document. Moreover, multi-page data is generated as one data item of a plurality of pages that constitute the document, and is managed, as data belonging to the document, in the same stage as the image data of each page.

As a result, the invention can provide an image processing system capable of managing image data by using the advantage of image data (single page data) of each page suitable for updating performed in units of one page, and also the advantage of image data (multi-page data) of a plurality of pages suitable for processing performed in units of one document.

In addition, the system may be modified such that the multi-page data is created in accordance with the instruction of the user. In this case, the control section 2a determines whether or not there is an instruction from the user to generate multi-page data (step 24). If it is determined that there is an instruction to generate multi-page data, the control section 2a makes the program proceed to the step 25, where multi-page data is generated. If, on the other hand, it is determined that there is no instruction, the control section 2a makes the program proceed to the step 26 without the generation of the multi-page data.

As described above, the multi-page data is created in accordance with an instruction from the user. This being so, when no multi-page data is necessary, the storage capacitance can be saved or processing speed can be increased by omitting the instruction to generate the multi-page data.

Referring then to FIGS. 1, 2 and 8–14, a second embodiment of the invention will be described in detail. The second embodiment can be realized using the image reading section 11, the image management section 20, the image storage section 21, the multi-page data generating section 22, the special sheet detecting section 25, the display section 31 and the operating section 32.

The special sheet detecting section 25 is provided for detecting, from a read image, a separator sheet (a separator), for example, on a predetermined portion of which a predetermined image is printed. In other words, the special sheet detecting section 25 determines whether or not read image data indicates that there is a predetermined image on a predetermined portion of the read image, thereby detecting the separator sheet. The separator sheet is used to indicate the start of each document, when simultaneously reading a plurality of documents.

It is preset whether or not each document to be separated by a corresponding separator sheet includes, in the pages of the document, an image detected as the separator sheet. Alternatively, the user may instruct whether or not the separator sheet is included in the pages of the document.

Figure 8:
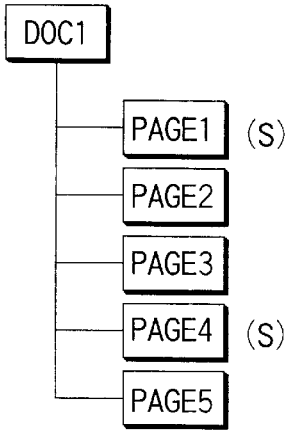
FIG. 8 is a view illustrating an image management structure assumed immediately after a document including a separator sheet is read.

FIG. 8 is a view, showing an example of a stage structure of initial management data obtained when an original document of a plurality of pages that include separator sheets and are set at the ADF 11a has been read. In this case, the original document has five pages, and its first and fourth pages are separator sheets.

When the pages of an original document set at the ADF 11a have been read by the digital copy machine 1, the image data indicates the read original document of five pages, which belongs to a document 1. At this time, each image data item is in an initial state wherein no separator sheet detection is performed.

In this state, the special sheet detecting section 25 performs detection of a separator sheet in units of one page. If the first and fourth pages are detected to be separator sheets, the read image data of the five pages is divided into two documents, i.e. a document 1 and a document 2, on the basis of the detection positions of the separator sheets.

Figures 9A, 9B:
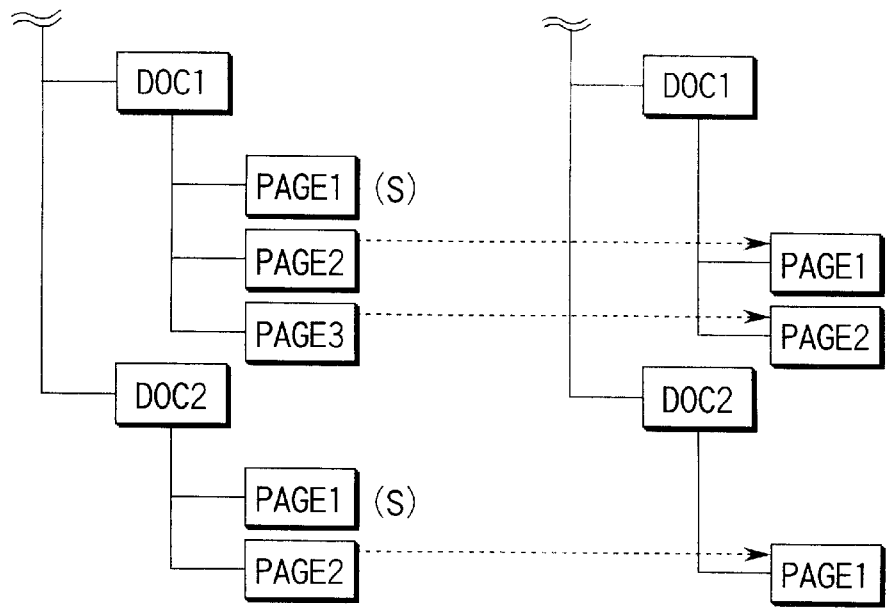
FIGS. 9A and 9B are views illustrating image management structures assumed when image data is divided in units of a document by a separator sheet.

If it is beforehand set such that the image data constituting a document contains image data indicating a separator sheet, each document obtained by the above division is managed with the separator sheet included therein. Specifically, the read image data of five pages is divided into a document 1 (DOC1) consisting of a page 1 (Page 1), a page 2 (Page 2) and a page 3 (Page 3), and a document 2 (DOC2) consisting of a page 1 (Page 1) and a page 2 (Page 2), as is shown in FIG. 9A.

Accordingly, the page 1 of the document 1 is the image (image data) of the first page of the read original document of five pages, and this image indicates a separator sheet. The page 2 of the document 1 is the image of the second page of the read original document of five pages. The page 3 of the document 1 is the image of the third page of the read original document of five pages. The page 1 of the document 2 is the image of the fourth page of the read original document of five pages, and this image indicates another separator sheet. The page 2 of the document 2 is the image of the fifth page of the read original document of five pages.

If, on the other hand, it is beforehand set such that the image data constituting a document does not contain image data indicating a separator sheet, each document obtained by the above division is managed without including the separator sheet. Specifically, the read image data of five pages is divided into a document 1 (DOC1) consisting of a page 1 (Page 1) and a page 2 (Page 2), and a document 2 (DOC2) consisting of a page 1 (Page 1), as is shown in FIG. 9B.

Since in this case, the first page of the read image data of five pages is detected to be a separator sheet, it is deleted and not included in the document 1. Similarly, the fourth page of the read image data of five pages is detected to be a separator sheet, it is deleted and not included in the document 2.

Accordingly, in the document 1, the page 1 is the image of the second page of the read original document of five pages, while the page 2 is the image of the third page of the read original document of five pages. Further, in the document 2, the page 1 is the image of the fifth page of the read original document of five pages.

Figures 10A, 10B:
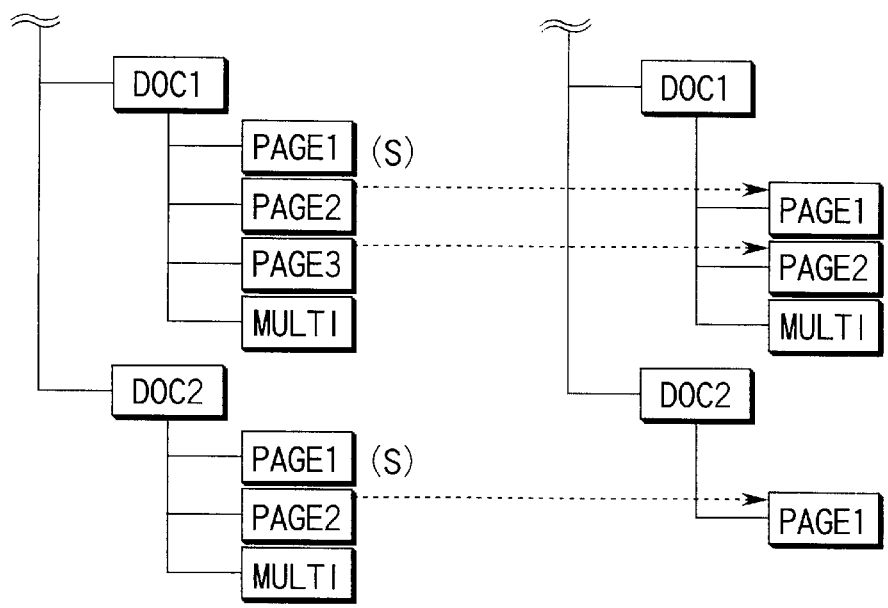
FIGS. 10A and 10B are views illustrating image management structures assumed when a multi-page file is created for each document.

Multi-page data is generated for each document resulting from the division using the separator sheets. Where, for example, each document includes a separator sheet, multi-page data is generated for the entire document that includes the image data indicating the separator sheet, as is shown in FIG. 10A. The multi-page file consisting of the multi-page data is managed in the same stage as a single-page file for each page.

In other words, multi-page data of three pages indicating the pages 1, 2 and 3 of the document 1, and multi-page data of two pages indicating the pages 1 and 2 of the document 2 are created. As a result, the multi-page file for the document 1 is managed in the same stage as each single-page file for a corresponding one of the pages 1, 2 and 3 of the document 1. Further, the multi-page file for the document 2 is managed in the same stage as each single-page file for a corresponding one of the pages 1 and 2 of the document 2.

Where each document does not include a separator sheet, multi-page data indicating the entire document without the separator sheet is generated as shown in FIG. 10B. The multi-page file consisting of the multi-page data is managed in the same stage as each single-page file for a corresponding page.

Specifically, in the case where no separator sheet is included, multi-page data indicating the pages 1 and 2 of the document 1 is created. However, in the document 2 that is constituted of only one page, multi-page data, if created, is the same as the single page data indicating the page 1. Therefore, multi-page data is not created. As a result, in the document 1, the multi-page file is managed in the same stage as each single pate file for a corresponding one of the pages 1 and 2, while in the document 2, only a single-page file for the page 1 is managed.

FIG. 11 illustrates an example of a display, on the display section 31, of management data for each file included in a document, which has a stage structure and is stored in the image management section 20.

When for example, the user has instructed the display section 31 to display the stored contents, using the operating section 32 of the PC 3, the display section 31 displays icons indicating documents. Then, when the user has selected a document, using one of the icons, the PC 3 analyzes the files as image data in stages in accordance with the stage structure of the management data of the image management section 20 of the file server 2. On the basis of the analysis results, the display section 31 at least displays documents and each page thereof as shown in FIG. 11. The screen of the display section 31 is divided into left and right portions. The left portion displays documents, while the right portion displays pages. Each page may be represented by a contracted image or a file name. Although the multi-page data exists in the same stage as each single page data because of the management data structure, it is not displayed on the right portion of the screen since it corresponds to the document stage.

When displaying documents, a document with multi-page data is represented by an icon differing in color or shape from an icon that represents a document without multi-page data, so that the user can recognize at a glance any document with multi-page data.

Furthermore, when displaying documents, an icon 111 is used to represent a document without multi-page data, an icon 112 is used to represent a document with multi-page data but without a separator sheet, and an icon 113 is used to represent a document with multi-page data and a separator sheet. The icons 111–113 differ from each other in color and/or shape. As a result, the user can recognize at a glance any document with a separator sheet, as well as a document with multi-page data.

Referring now to the flowcharts of FIGS. 12 and 13, a description will be given of the operation performed by the user to read a plurality of documents separated by the separator sheets.

First, the user sets each of a plurality of documents on the ADF 11a of the digital copy machine 1 to make images thereon be read (step 31). Then, a start button (not shown) in the operating section 32 is pushed (step 32), thereby causing the digital copy machine 1 to start the reading of each document on the ADF 11a.

When instructing the machine to include or not to include a separator sheet, the user operates the operating section 32 to display image data on the display section 31 of the PC 3, to select a target page (step 33), and to make an instruction to include or not to include a separator sheet (step 34). Thus, whether or not a separator sheet is included is determined by the instruction of the user.

Figure 14:
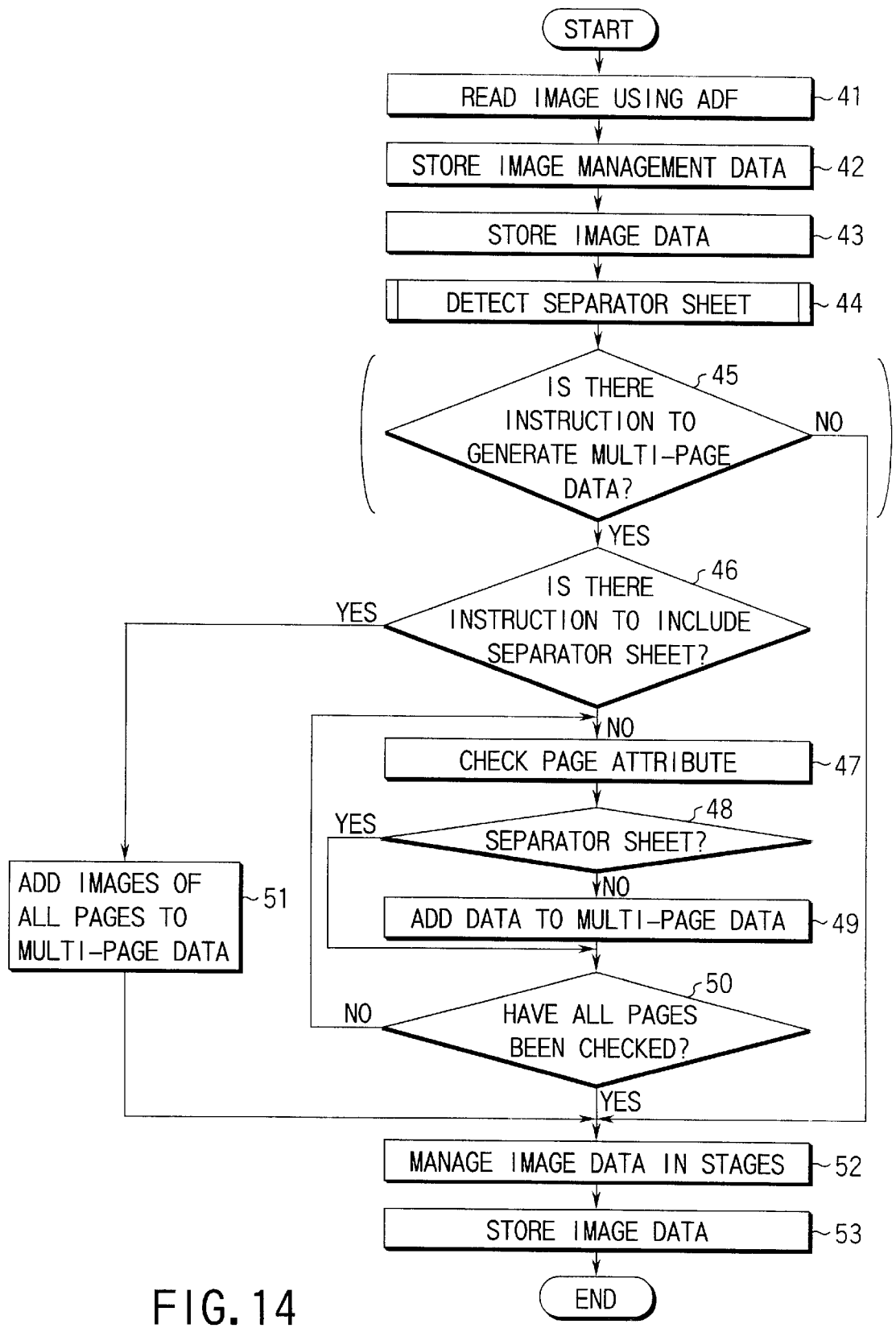
FIG. 14 is a flowchart useful in explaining the operation of the image processing system assumed when dividing a to-be-read document by the separator sheet.

Referring to the flowchart of FIG. 14, a description will be given of the operation of the image processing system executed when reading a plurality of documents separated by separator sheets.

When the image processing system has read an image on a document placed on the ADF 11a (step 41), it generates management data for image data of each page, stores it in the image management section 20 (step 42), and stores image data of each page as a single-page file in the image storage section 21 (step 43).

Then, the special sheet detecting section 25 of the file server 2 determines whether or not the read image data includes information that indicates a separator sheet, thereby detecting a separator sheet (step 44). Where the generation of multi-page data is preset, or where there is an instruction from the user to generate multi-page data (step 45), the control section 2a determines whether or not a separator sheet is included in a document, on the basis of the set contents (step 46).

If it is determined that no separator sheet is included in a document, the control section 2a imparts, to read image data of each page, an attribute that clarifies whether or not the data indicates a separator sheet, on the basis of the detection result at the step 44 (step 47). On the basis of this attribute, the control section 2a sequentially determines whether or not each page is a separator sheet (step 48). The image data, which is determined not to be a separator sheet, is determined to indicate a page included in a document and hence added to multi-page data (step 49). If, on the other hand, the image data is determined to be a separator sheet, the control section 2a determines that it does not indicate a page included in the document, and hence does not add it to the multi-page data, and makes the multi-page data indicate that one document is formed of pages previous to the present page determined to be a separator sheet.

After that, the control section 2a determines whether or not processing has been performed on all pages, on the basis of whether or not the image data obtained after the steps 47–49 indicates the last page of the read document (step 50). If it is determined that all pages have not yet been processed, the processes at the steps 47–50 are repeated.

If, on the other hand, all pages have been processed, the control section 2a stores, in the image management section 20, management data in which management data for multi-page data is in the same stage as management data for single page data (step 52), and simultaneously stores the multi-page data as a multi-page file in the image storage section 21 (step 53).

Further, if it is determined at the step 46 that the document includes a separator sheet, a separator sheet is included in a document, image data detected as a separator sheet is made to be the first page, and image data indicating pages detected immediately before the next separator sheet is detected are sequentially included in multi-page data as well as the image data as the first page. Thus, all read image data items are processed and multi-page data is created in units of one document (step 51). After all the read image data items are processed, the control section 2a makes the program proceed to the step 52, thereby managing image data of each page and multi-page data in stages in units of one document (step 52). Further, the control section 2a stores the image data items in the form of single-page files and multi-page files (step 53).

As described above, a separator sheet that indicates the start of a document is detected to automatically determine the start of each document, and it is determined, by an instruction from the user or presetting, whether or not each detected separator sheet is included in a document, thereby creating multi-page data for each document.

By virtue of this structure, the user can make an instruction or setting to include or not to include a separator sheet in a document. In the case of including a separator sheet in a document, multi-page file is automatically created for each document which includes a separator sheet, whereby the document can be easily corrected if the separator sheet is erroneously detected.

In the case of including no separator sheet, multi-page data with no separator sheet is automatically created for each document, whereby multi-page data can be obtained which is easy for the user to deal with since image data irrelevant to the main contents of each document is not contained therein.

Referring to FIGS. 1, 2 and 15–17, a third embodiment will be described in detail. The third embodiment can be realized using the image reading section 11, the image management section 20, the image storage section 21, the multi-page data generating section 22, the image updating section 23, the multi-page data updating/deleting section 24, the updating operation detecting section 26, the display section 31 and the operating section 32.

The image updating section 23 updates image data as each single-page file stored in the image storage section 21.

The multi-page data updating/deleting section 24 updates or deletes multi-page data.

The updating operation detecting section 26 detects the updating of the contents of each file as image data stored in the image storage section 21.

FIGS. 15A and 15B are views, useful in explaining a change in the structure of management data, which occurs when one page is deleted from a document. In the FIG. 15A case, a document 1 (DOC1) consists of a page 1 (Page 1), a page 2 (Page 2) and a page 3 (Page 3), and multi-page data (Multi) exists. In this state, the page 2 is deleted as shown in FIG. 15B.

Specifically, when the user has performed an operation to delete the page 2 from the document 1 that consists of the pages 1, 2 and 3, the updating operation detecting section 26 detects the updating of the contents of the document 1. Then, the image updating section 23 deletes the original page 2, and the image management section 20 changes the original page 3 to a new page 2, thereby providing an updated document 1 that consists of new pages 1 and 2. Further, the multi-data updating/deleting section 24 creates new multi-page data concerning the new pages 1 and 2. As a result, the image management section 20 manages single-page files (corresponding to the pages 1 and 2) and a multi-page file, which are considered files belonging to the document 1.

Referring then to the flowchart of FIG. 16, an operation performed by the user to update image data will be described.

When updating image data of files stored in the image storage section 21 and managed by the image management section 20, by insertion, addition, change or deletion of a file, or change of the order of pages, the user operates the display section 31 to display related image data and its management data (step 61). Then, the user selects target image data from the displayed one, and inputs to-be-updated contents (step 62). As a result, the image data is updated.

Figure 17:
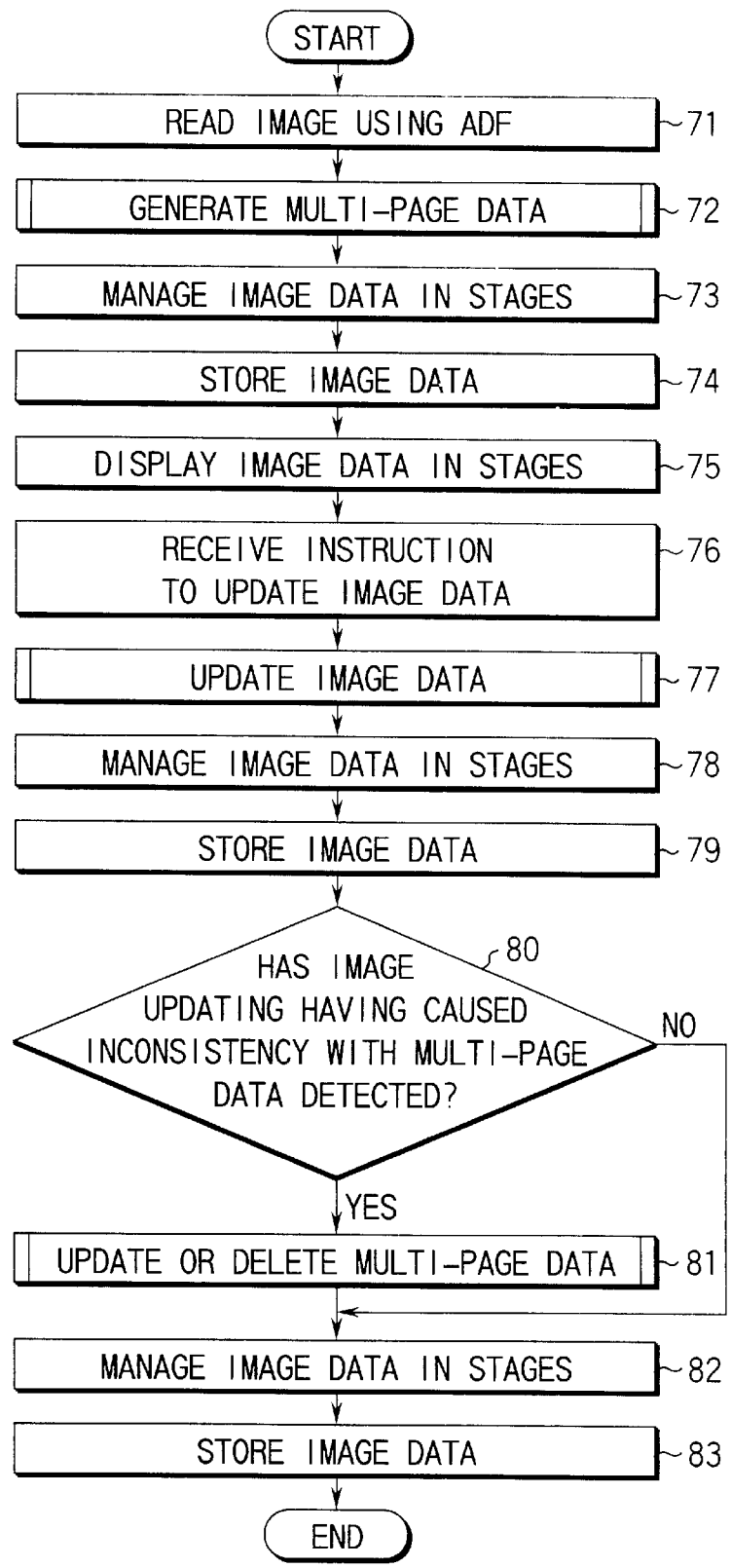
FIG. 17 is a flowchart useful in explaining the operation of the image processing system assumed when the file has been updated.

Referring to the flowchart of FIG. 17, the operation of the image processing system to update image data will be described.

In accordance with the user's operation, image data on documents set on the ADF 11a is read (step 71), thereby creating multi-page data for each document (step 72). The file server 2 causes the image management section 20 to store management data for managing the created management data in a stage structure (step 73), and also causes the image storage section 21 to store the created multi-page data as a multi-page file (step 74).

When performing the updating (file insertion, addition, change, deletion, order change, etc.) of files (image data) stored in the image storage section 21 by the processing at the steps 71–74, the user operates the operating section 32 to cause the display section 31 of the PC 3 to display a management structure applied to each file and an image as the contents of each file (step 75). The user then operates the operating section 32 so as to instruct the system to update file contents (file insertion, addition, change, deletion, order change, etc.), whereby the control section 2a accepts the instruction of the user to update the file contents (step 76).

Then, the control section 2a updates a target file in accordance with the instruction received by the image updating section 23 (step 77). For example, when deletion of a single-page file corresponding to the page 2 that belongs to the document 1 consisting of the pages 1–3 and the multi-page data is instructed as shown in FIGS. 15A and 15B, the original page 2 is deleted and the original page 3 is changed to a new page 2, which is the updating of the single-page file structure of the document 1.

After finishing the updating of the single-page file structure of the document according to the instruction of the user, the control section 2a stores, in the image management section 20, management data for updated single-page files (step 78). The updated single-page files are stored in the image storage section 21 (step 79).

After the updated single page files are stored in the image storage section 21, the updating operation detecting section 26 of the file server 2 detects whether or not the contents of the updated single-page files stored in the image storage section 21 are consistent with those of the multi-page file (step 80).

If the detection result indicates that their contents are not consistent, multi-page data included in the document is updated (created) by the multi-page data updating/deleting section 24 so that it will be consistent with the updated single-page files (step 81).

After that, the control section 2a creates management data for managing the updated multi-page data to thereby update the management stage structure (step 82) and store, in the image storage section 21, the updated multi-page data as a new multi-page file (step 83).

If, on the other hand, there is no consistency between the contents of the multi-page file and of the updated single-page file, the stage structure for managing the multi-page file is kept unchanged (step 82), and stored in the image storage section 21 (step 83).

Since as described above, inconsistency will occur, when page edition has been performed, in the dual management of image data using a single-page file and a multi-page file, the image data of the multi-page file may be updated when the contents of any single-page file have been changed.

As a result, consistency between the single-page file and the multi-page file can be secured, and inconsistency therebetween can be prevented or eliminated even when page edition is performed.

Although in the above-described embodiment, a description was given of the updating of the contents of the multi-page file, which is performed when image data of a single-page file is updated, the multi-page data may be deleted when the contents of any file included in a document have been changed. This is because where the contents of the multi-page file are updated whenever the user performs image updating, a large amount of storage capacity is necessary and it is possible that the processing will become extremely slow. If in this case, it is determined at the step 81 that the multi-page file contains inconsistency, the multi-page file is deleted.

Accordingly, processing can be realized, in which inconsistency does not occur between a single-page file and a multi-page file, also which is prevented from becoming extremely slow, and which does not require a large amount of storage capacity.

Referring to FIGS. 1 and 18–20, a fourth embodiment will be described in detail. The fourth embodiment is realized by the image reading section 11, the image management section 20, the image storage section 21, the multi-page data generating section 22, the image data selecting section 27, the image output section 28, the application/data-format correspondence table 29, the display section 31 and the operating section 32.

The image data selecting section 27 selects image data to be transferred. Specifically, selection of a multi-page file, if included in a document, should have preference over selection of single-page files when all single-page files of the document are selected.

The image output section 28 outputs the selected image data to a designated application.

The application/data-format correspondence table 29 stores information that indicates whether or not another application can receive the multi-page data.

Figures 18, 19:
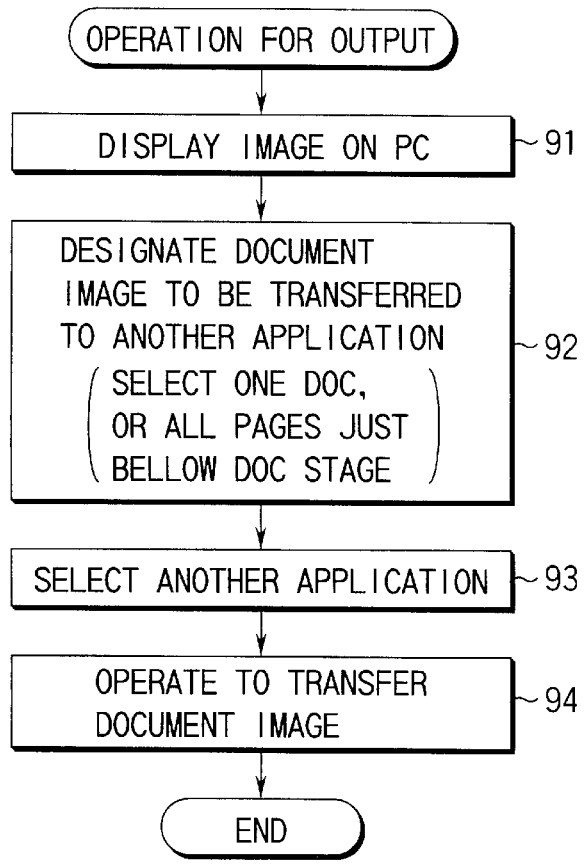
FIG. 18 is a view showing an example of a table that shows the relationship between applications and data formats.
FIG. 19 is a flowchart useful in explaining the operation of outputting a document.

FIG. 18 shows the structure of the application/data-format correspondence table 29. As shown, the table 29 stores application names, the version of each application, and the attribute of image data which each application can receive. In other words, whether or not image data can be received by a certain application (whether or not a multi-page file corresponds to an application) is known from the attribute of the image data.

Referring to the flowchart of FIG. 19, an operation performed by the user to transfer a document will be described.

When transferring image data stored in the image storage section 21, the user displays a target image on the display section 31 of the PC 3 (step 91), and selects a document image based on the displayed image (step 92). Further, the user selects an application to which the image is to be transferred (step 93), thereby selecting an operation for the transfer of the document image (step 94). As a result, the document image data is transferred.

Figure 20:
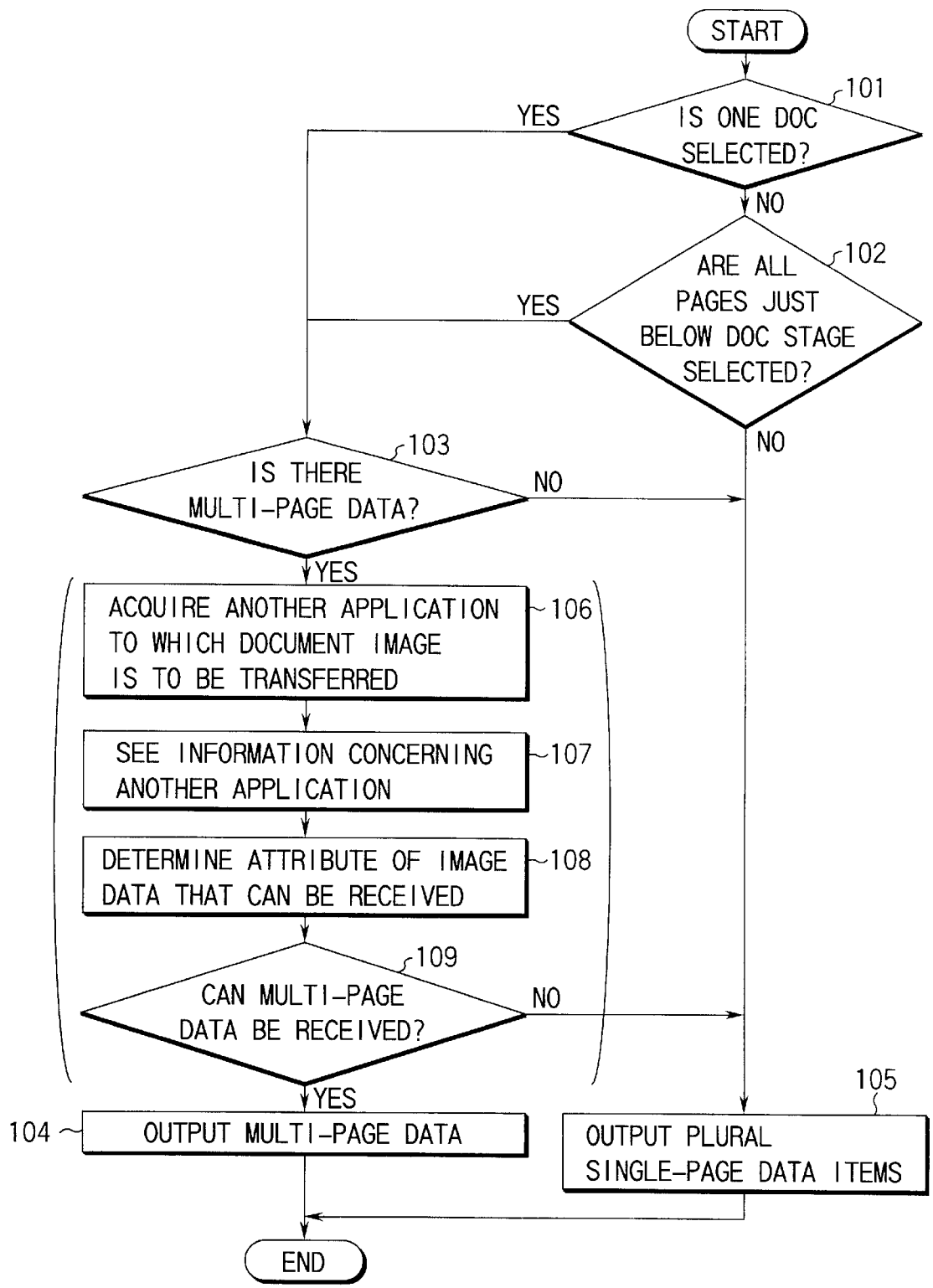
FIG. 20 is a flowchart useful in explaining processing performed when outputting a document.

Referring then to the flowchart of FIG. 20, the operation of the system performed when transferring a document image will be described.

When the user has instructed the system to transfer a document, the file server 2 acquires, from the PC 3, the document to be transferred and the name of an application to which the document is to be transferred.

After that, the file server 2 determines whether one document is selected on the basis of the instruction from the operating section 31 of the PC 3 (step 101), or whether selection of all pages placed in a stage just below a document stage has been instructed (step 102).

If one document has been selected, or if all pages just below the document stage have been selected, the control section 2a determines whether or not a multi-page file exists in the files belonging to the selected document (step 103). If it is determined that the multi-page file exists, the image output section 28 outputs the multi-page file to the addressed or target application (step 104).

If the above conditions are not satisfied, i.e. if only some of the single-page files of the document are selected, or if the document does not include any multi-page file, a single-page file corresponding to a selected page is output t the addressed application (step 105).

As described above, where the output of the entire document or of all pages constituting the document is selected, it is determined whether or not a multi-page file exists, thereby outputting the multi-page file if it exists.

Thus, when outputting a document, a multi-page file can be output without the user's confirmation as to whether the multi-page file exists, which enhances the operability of the system.

In addition, the system may be modified such that determination as to whether an addressed application can receive a multi-page file is performed, and that when it can, the multi-page file is output, whereas when it cannot, a single-page file is output.

In this case, it is determined at the step 103 whether or not a multi-page file exists, and if it exists, the control section 2a acquires the name of the application addressed by the user (step 106). After that, the control section 2a refers to the application/data-format correspondence table 29 to determine whether or not the application with the acquired application name corresponds to the multi-page file (step 107), thereby determining the attribute of a file that the addressed application can receive (step 108). After this determination, the control section 2a determines whether or not the addressed application can receive the multi-page file (step 107).

If it is determined that the application can receive the multi-page file, the image output section 26 outputs the multi-page file to the addressed application (step 104). If, on the other hand, it is determined that the application cannot receive the multi-page file, a plurality of single-page files that belong to a document are output (step 105).

As described above, it is determined, with reference to the application/data-format correspondence table 29, whether or not an addressed or target application can receive a multi-page file. If it can receive the multi-page file, the multi-page file is output, whereas if it cannot receive the file, a plurality of single-page files constituting a designated document are output.

Thus, the user can output the image data of a document without confirming whether or not an addressed application can receive the multi-page file of the document, which enhances the operability of the system.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An image processing system comprising:
   a scanner which scans each of a plurality of pages that constitute a document;
   a storage device which stores single-page data that consists of image data of each page scanned by the scanner;

a management section which manages, as data belonging to the document, each item of the single-page data stored by the storage device;

a generation section which generates multi-page data indicating images of a plurality of pages that constitute the entire document scanned by the scanner, the management section controlling the storage device to store the multi-page data generated by the generation section, and managing the single-page data items and the multi-page data as data belonging to the document;

a control section which determines, when an instruction is made to output a document managed by the management section, whether or not the document contains multi-page data, and which determines whether or not the destination can receive the multi-page data, when determination shows that the document contains the multi-page data; and an output section which outputs the multi-page data when the control section has determined that the destination can receive the multi-page data, and for outputting all single-page data items belonging to the document, when the control section has determined that the document does not contain the multi-page data, or that the destination cannot receive the multi-page data.

2. An image processing system comprising:

a scanner which scans each of a plurality of pages of a document;

a storage device which stores single-page data including image data of each page scanned by the scanner;

a detection section which detects a separator that indicates a delimiter of each document scanned by the scanner;

a management section which manages each single-page data stored in the storing device, as data belonging to each document delimited by the separator detected by the detection section;

a generation section which generates multi-page data indicating images of a plurality of pages that constitute an entire document scanned by the scanner, which determines whether or not image data indicating the separator detected by the detection means is included in multi-page data corresponding to each document defined by the separator, which generates multi-page data including image data indicating the separator if it is determined that the image data indicating the separator is included in the multi-page data, and which generates multi-page data including no image data indicating the separator if it is determined that the image data indicating the separator is not included in the multi-page data, wherein the management section controls the storage device to store multi-page data generated by the generation section, and manages the single-page data items and the multi-page data as data belonging to the document.

3. An image processing system comprising:

a scanner which scans each of a plurality of pages of a document;

a storage device which stores single-page data including images of each page scanned by the scanner;

a management section which manages each single-page data stored by the storage device, said each single-page data being managed as data of said document, the management section controlling the storage device to store multi-page data generated by the generation section, and managing the single-page data items and the multi-page data as data belonging to the document;

a generation section which generates multi-page data including images of a plurality of pages of an entire document scanned by the scanner;

a determination section which determines, when an instruction is made to output a document managed by the management section, whether or not the document contains multi-page data; and an output section which gives preference to output of multi-page data when the control section has determined that the document contains the multi-page data, and which outputs all single-page data items belonging to the document, when the determination section has determined that the document does not contain the multi-page data.

4. An image processing system comprising:

a scanner which scans each of a plurality of pages of a document;

a storing device which stores image data in a file format;

a management section which controls the storing device to store an image data file of each page read by the scanner, and which manages each file as single-page data of the document; and a generation section which generates a single file including image data on all pages of a single document read by the scanner, when said all pages have been scanned, the management section controlling the storing device to store a single file including image data on all pages of the document generated by the generation section, and managing the single file in a same stage as the single-page data, the single file being managed as multi-page data of the document.

5. An image processing system according to claim 4, further comprising:

an update detection section which detects an update of a file that is managed by the management section as single-page data; and a multi-page data update section which updates contents of multi-page data of a same document as updated single-page data, in accordance with updated contents corresponding to the single-page data, said contents of multi-page data being updated upon detection of an update of a file that is managed by the update detection section as single-page data.

6. An image processing system according to claim 4, further comprising:

an update detection section which detects an update of a file managed by the management section as single-page data; and a multi-page data deletion section which deletes a multi-page data file of a same document as updated single-page data, said multi-page data file being deleted upon detection of an update of a file that is managed by the update detection section as single-page data.

* * * * *